Nov. 30, 1971   J. E. EDGELL ET AL   3,623,223
CORDLESS ELECTRIC GRASS SHEAR
Filed Nov. 7, 1969   2 Sheets-Sheet 1
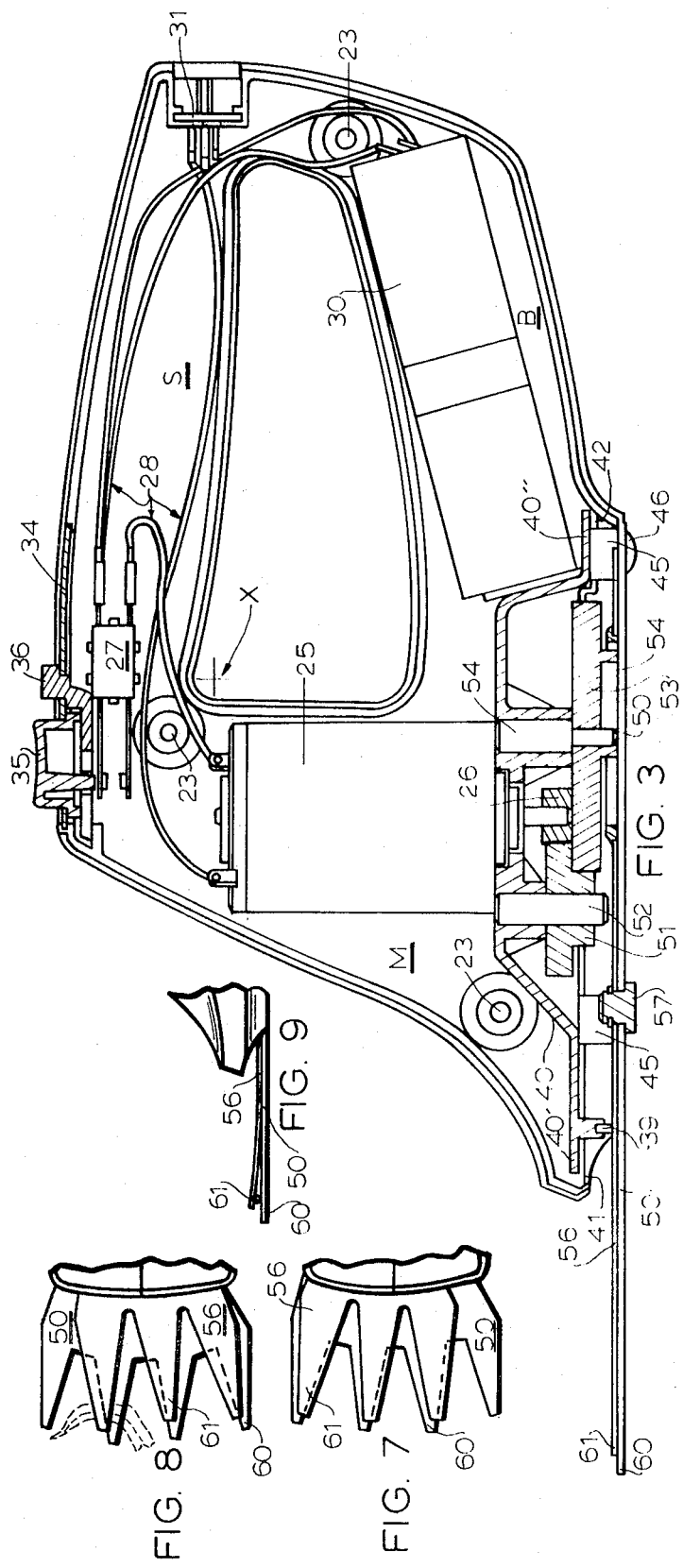
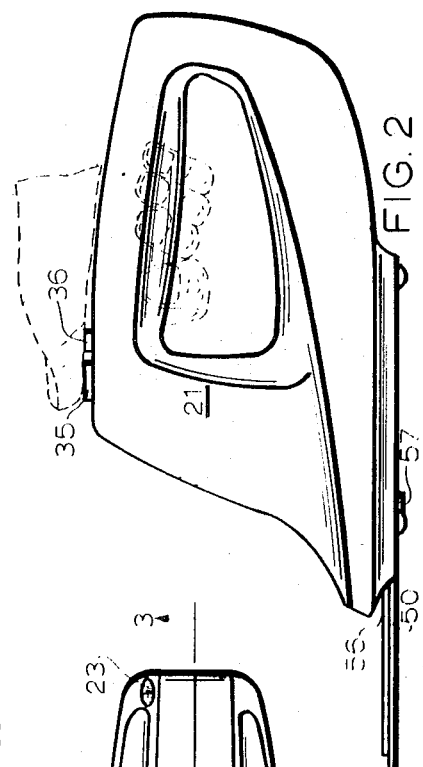
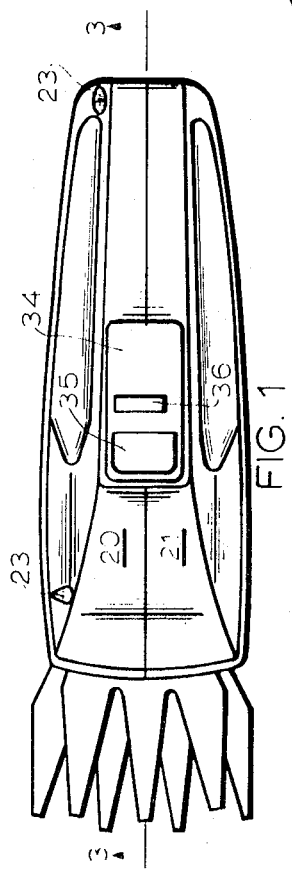
INVENTORS,
James E. Edgell
Daniel A. Maniero
William C. Albertson, Jr.
BY
ATTORNEY

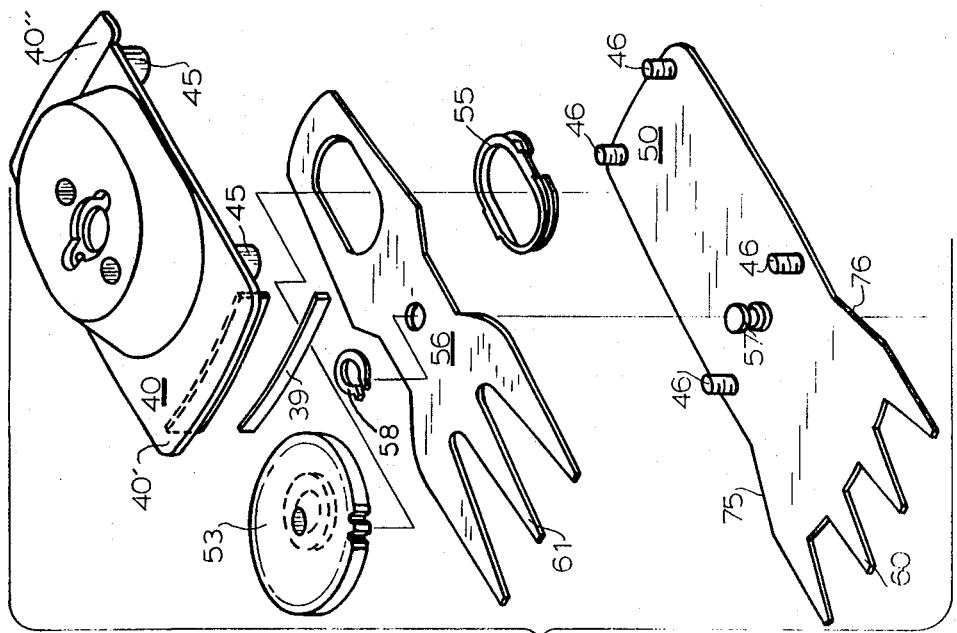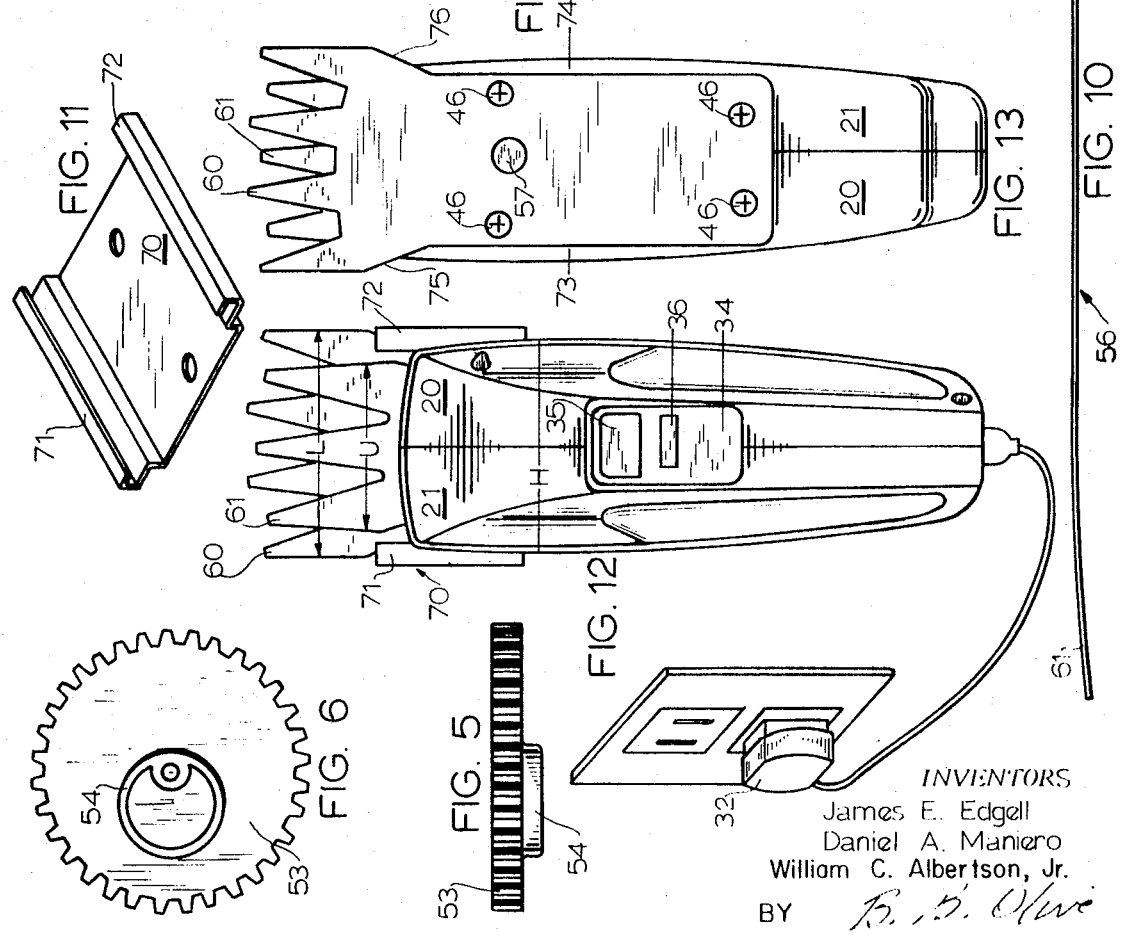

United States Patent Office 3,623,223
Patented Nov. 30, 1971

3,623,223
CORDLESS ELECTRIC GRASS SHEAR
James E. Edgell, Bradford Woods, and Daniel A. Maniero, Pittsburgh, Pa., and William C. Albertson, Jr., Rocky River, Ohio, assignors to H. K. Porter Company, Inc., Pittsburgh, Pa.
Filed Nov. 7, 1969, Ser. No. 874,864
Int. Cl. B26b 19/02
U.S. Cl. 30—220
12 Claims

ABSTRACT OF THE DISCLOSURE

A battery operated grass shear incorporates a low friction, flexible tooth blade adapted to slide over tough grass without stopping the cutting action and further incorporates a hollow housing having various specially disposed handle, motor and battery compartments.

BACKGROUND OF THE INVENTION (1) Field of the invention

The invention relates to electrically powered garden tools, More particularly, the invention relates to a battery operated grass shear and particularly to the blade and housing constructions.

(2) Description of the prior art

Various electrical powered shears have been known such as electric hedge clippers and the like. In an early U.S. Pat. 432,433 there is a teaching of an electric vibrator type battery powered shear. As to shear blade construction the use of a fixed blade having a set of teeth in conjunction with a moveable blade having a set of mating teeth such that grass is caught and sheared between the tooth edges is also old in the art. This general blade construction is found in mowers for cutting hay and tall grass as well as in hedge trimmers. However, considerable power is required to move such blades and the blade fingers are generally rigid, inflexible and heavy in weight. Since such characteristics are required when cutting hay, tall heavy grass and the like. However, the modern suburban home has many small areas and narrow edges of substantially light grass around trees, flower gardens, sidewalks, adjacent steps, around animal pens, and the like. Many of these areas and edges are remote from electrical receptacles and the prior art has not provided a dependable, lightweight, cordless type shear specifically for cutting small light grass areas and edges to keep the same trim and neat.

SUMMARY OF THE INVENTION

The invention resides in providing a lightweight, portable, battery powered, cordless type grass shear having a pair of toothed blades formed of strips of thin, flexible, plate metal coated to reduce friction and in which each tooth of the upper blade is independently and sufficiently flexible to allow a tough grass blade to be caught and bent between an upper and a lower tooth so that such teeth may slide over such tough grass blade without jamming or stopping cutting action of the other teeth pending withdrawal of the grass blade and a further atempt at a different angle of cutting. This facility to adapt to light grass except for the infrequent tough blade requiring a special angle of cut thus reduces the power requirement, speeds up the operation and better utilizes the time between battery charges. Furthermore, the blades are simple to produce being basically metal stampings having bevelled edges and a Teflon coating both of which reduce power consumption. The teeth are cut in flared ends.

In another aspect of the invention, the blade teeth are mounted forwardly of a housing which provides a hollow horizontally disposed handle compartment adapted to mount the control switch and a switch lock and to contain within the housing related wiring. The housing provides below and forwardly of the handle compartment a vertically disposed compartment in which is vertically mounted a substantially high speed D.C. motor and below this related speed reducing gears and means adapted to oscillate the upper shear blade for shearing the grass. Below the handle compartment and rearwardly of the motor compartment and motor there is disposed the battery in a substantially horizontal compartment. With the described blades protruding from the front of the housing and the battery and motor mounted as mentioned a balance of weight is obtained which is particularly suited to the application since the shear naturally balances in a position where without strain on the operator the blades are maintained in a proper horizontal cutting posture. Flared blade ends preserve a narrow width.

DESCRIPTION OF THE DRAWINGS

FIG. 1 is a plan view of the shear of the invention.

FIG. 2 is a side elevation view of the shear and in dashed lines showing the hand position.

FIG. 3 is a section view taken along line 3—3 of FIG. 1.

FIG 4 is an exploded view of the blade and blade gear drive assembly.

FIG. 5 is an elevation view of the blade drive gear.

FIG. 6 is a bottom view of the blade drive gear.

FIG. 7 is a partial top view showing the upper blade moved to an extreme right position.

FIG. 8 is a view similar to FIG. 7 but showing the upper blade moved to the left with a tough uncut blade caught between the teeth.

FIG. 9 is a partial elevation showing an upper blade tooth flexed upwardly.

FIG. 10 is an enlarged elevation view of the upper blade to show its curvature.

FIG. 11 is a wall bracket designed to hold the shear by the blades when being recharged.

FIG. 12 illustrates the shear in the bracket during recharging.

FIG. 13 is a bottom view of the shear.

DESCRIPTION OF THE PREFERRED EMBODIMENT

In the embodiment of the invention shown in the drawing a right housing 20 is joined to a left housing 21 by means of screws 22 which mount in screw insets 23 provided in the right housing 20. The housing which is molded of lightweight plastic, provides a front vertical tubular compartment M in which is vertically disposed a substantially high speed DC motor 25 on whose shaft is securely mounted a cast or stamped pinion gear 26. The housing further provides a substantially horizontal tubular compartment S forming a handle portion as best shown in FIG. 2 and which provides room for internal mounting of the control switch 27 and associated wiring 28. Below the compartment S and rearwardly of the compartment M is a third substantially horizontal tubular compartment B in which is disposed a rechargeable and normally elongated battery pack of two batteries 30 having a terminal 31 mounted at the rear of the housing and suited to connecting to an AC source through recharging circuitry 32 as shown in FIG. 12. Forwardly of the handle formed by compartment S the housing mounts a plate 34 in which are disposed a manual switch button 35 and a switch lock 36 by which button 35 may be locked in an off position when not in use. Since motor 25 and batteries 30 are the major contributors to the weight of the shear it will be seen that the particular cavity arrangement of the housing not only provides a comfortable handle arrangement for the operator but gives a good weight balance in that with the added nominal weight of the blades and gearing to be described the shear balances on the lateral axis indicated at X and which is immediately forward of the normal hand grip position shown in FIG. 2 and at the approximate juncture of compartments M and S. The operator is thus not compelled to work against a tipping force either forwardly or rearwardly during use.

The base of the housing halves 20, 21 are molded with mating front and rear ledges 41, 42 which support an aluminum metal cast base 40 by the base edges 40', 40". Base 40 in turn has four integral and downwardly projecting posts 45 which receive four screws 46 which secure the bottom blade 50 to the base 40.

Pinion gear 26 rotates at the relatively high speed of motor 25 and drives a combination gear 51 which may be formed of nylon and which rotates on fixed stub shaft 52 and in turn drives a spur gear 53, formed of nylon or the like, which rotates on a stub shaft 54. As best shown in FIGS. 4, 5 and 6, spur gear 53 includes an integral drive cam 54 which wipes against a plastic bearing insert 55. Insert 55 mounts in the upper moveable blade 56 so that as gear 53 rotates blade 56 is pivoted back and forth on a pin 57 which passes through the fixed blade 50. Lock ring 58 is mounted on pin 57 as shown in FIG. 4 which makes the upper blade 56 and bottom blade 50, once worn, removable and replaceable as an assembly simply by removing and replacing the four screws 46. Thus, as the light grass which is intended to be cut by the shear of the invention is caught between the teeth 60 of the fixed lower blade 50 and the teeth 61 of the pivotal upper blade 56 a shearing action is effected between opposed edges of the respective teeth. In order to obtain a wiping or drawing effect similar to that obtained in a pair of scissors, the teeth 61 of the upper blade 56 at their forward ends are given a slight downward curvature as illustrated in the enlarged elevation view of FIG. 10. A dust pad 39 prevents entry of grass cuttings, dirt and the like into the gear mechanism. Lower blade 50 acts as a bottom cover.

Since the primary purpose of the invention is to provide a relatively lightweight and weight balanced portable, cordless type shear that can be used by the housewife for light grass shearing in locations not adapted to the usual gasoline or AC powered heavy shearing equipment the conventional shear blade construction does not adapt to the invention. In particular, it will be noted that the shear with only four teeth 60 in the lower fixed blade 50 and three teeth 61 in the upper pivotal blade 56 is designed for a relatively narrow cut which inherently reduces the battery power consumed and lengthens life between charges. Furthermore, the blades 50 and 56 instead of being cast or otherwise being made relatively inflexible, thick and heavy as with heavy duty hedge clippers, shears and the like are instead stamped out of relatively thin metal strips and the upper blade 56 in a preferred form is made substantially thinner than the lower blade 50. Both blades are coated with Teflon-S material to reduce friction. Therefore, when a relatively tough blade of grass is caught between respective teeth as illustrated in FIG. 8 the particular upper tooth 61 may flex upwardly as further shown in FIG. 9 and temporarily slide over the tough blade until the operator withdraws the shear and finds an angle of cut more suited to shearing such tough blade. This flexing action is further enhanced by the fact that the depth of the grooves between the teeth 61 of the upper blade 56 is substantially deeper than the depth of the grooves between the teeth 60 of the lower blade 50. The teeth 61 of the upper blade 56, are therefore thinner, longer and more flexible than the teeth 60 of the lower blade 50 and both blades are lightweight. Also, each tooth of upper blade 56 is independently flexible of one another. The lower blade teeth 60 project slightly ahead of the upper blade teeth 61 so that if the operator strikes a brick wall, rock or the like the upper teeth 61 do not contact the same. Blade 50, as a bottom cover, also reduces weight. Furthermore, blade 50 retains blade 56.

To provide the described flexibility and lightweightness, the blades in one embodiment are made as follows. The upper blade 56 is stamped of AISI-C-1074, .035 inch thick steel strip, coated with Du Pont Teflon-S. The teeth 61 are made approximately 1.9 inches long, .625 inch wide at the base and are given a 30 degree bevel filing angle. In the same embodiment, the lower fixed blade 50 is formed of the same Teflon coated material. The teeth are made approximately 1.1 inches long, .44 inch at the base, with the same bevel filing angle on the teeth cutting edges but blade 50 is of .064 inch thickness which is slightly less than twice as thick as the upper blade 56. The blade flared end dimensions U and L, and housing width H (FIG. 12) of about 2.3, 3.0 and 2.7 inches respectively preserve a narrow working width. The blades cut a swath approximately three inches in width and the shear is essentially jam proof in the intended type of light and narrow width grass.

For charging and storage purposes a vertically secured wall bracket 70, as shown in FIG. 11, is formed of metal and provides a pair of opposed U-shaped sections 71, 72 between which fits the parallel edges 73, 74, shown in FIG. 13, of the housing bottom. When the shear is disposed as in FIG. 12, the outwardly angled edges 75, 76 shown in FIG. 4, are adapted to rest on the ends of sections 71, 72. Because of the previously described compartment and weight disposition the shear tends to "hug" the wall. Since the wiring arrangements utilized during operation of the shear and during recharging are fully revealed in the drawings and follow conventional practices in the art the same are not dealt with in detail. Batteries 30 in the embodiment described have a 4.8 volt and 1.2 ampere-hour rating and are connected in series to motor 25 of comparable electrical character to give the shear a battery life of approximately 30 minutes between charges. An overall weight of less than one and three-fourth pounds has been achieved, with a 4.75 and 8.75 ounce motor and battery.

In summary, it can be seen that the housewife or other operator in the home is given a particularly useful, lightweight, well balanced and essentially non-jamming portable and cordless type shear for cutting and maintaining trim, the various hard to maintain miscellaneous narrow edge and other light grass areas found around the average suburban home. The preferred motor operates at 10,000 r.p.m., drives cam 54 at 1000 r.p.m. and draws about 1.5 amperes of current. Thus, high blade torque with low battery drain is also achieved. Finally, ease of assembly and disassembly is achieved and involves primarily only the housing halves and bottom blade since these are arranged to secure the other components.

What is claimed is:

1. A portable battery shear adapted to shearing a relatively narrow width of light grass, comprising:
   (a) An integral molded housing providing a first substantially horizontal handle shaped compartment, a second compartment for storing a drive motor and a third compartment for storing a battery;
   (b) a motor mounted in said second compartment and having a drive shaft extending therefrom;
   (c) a battery mounted in said third compartment;
   (d) a manual control switch mounted in said first compartment and having connected wiring extending through said compartments enabling said switch to connect said battery to said motor and thereby drive said shaft;
   (e) a gear reduction train including in the first stage a gear driven by said shaft and in the final stage a cam driven through said train;
   (f) a base member mounted in said housing and mounting said motor and train;
   (g) a lower horizontal cutting blade having a generally rectangular thin flat sheet metal body having on one end a small plural number of triangular shaped cutting teeth of relatively short length and a coating providing a low friction surface, said lower blade body being fixedly secured to said housing below said train and said teeth projecting forwardly thereof;

(h) an upper horizontal cutting blade having a general rectangular thin flat sheet metal body substantially less thick than said lower blade, having a small plural number of triangular-shaped teeth on one end thereof and substantially longer length than said lower blade teeth and a coating thereon providing a low friction surface, said upper blade teeth having a slight downward curvature sufficient to effect a wipping action therewith, said upper blade being positioned on said lower blade to mate said teeth and having a pivotal mount central of its width and intermediate its length and a drive connection to said cam such that as said cam rotates said upper blade teeth are reciprocated to provide a cutting action and in the presence of a tough grass blade each said upper blade tooth being adapted to independently flex upwardly and slide over said tough grass blade to avoid jamming of said teeth; and (i) circuit connector means mounted in said housing and adapting said battery to be connected to external charging means.

2. A shear as claimed in claim 1 wherein said second compartment is vertically oriented, is forward of and communicates with both said first and third compartments, said third compartment is substantially horizontal and is disposed below said first compartment and the weight and disposition of said motor, battery, gear train and blade in said compartments is such that said shear tends to balance around a lateral axis extending through the approximate juncture of said first and second compartments.

3. A shear as claimed in claim 2 wherein said base member is generally rectangular and is provided with end portions, said housing is formed of secured mating vertical half side sections molded to provide said compartments and to further provide lip portions adapted to support said base member end portions, the body of said lower blade is secured to said base member and the body of said upper blade pivots between said lower blade and said base member, said cam drive connection comprises an opening in said upper blade body engaged by said cam and said upper blade is retained in position by the securing of said lower blade to said base member.

4. A shear as claimed in claim 1 wherein said lower and upper blade ends containing said teeth comprised a flared portion of each respective blade and the width of which approximates and preserves the working width of said housing.

5. A shear as claimed in claim 1 wherein said housing provides an opening in the bottom thereof below said gear train and said lower blade body is adapted to provide a cover for said opening.

6. A shear as claimed in claim 1 wherein said motor operates at substantially high speed, said gear train provides a substantial speed reduction, and said coating substantially reduces the friction between said blades to thereby obtain substantially high shearing forces between said teeth.

7. A shear as claimed in claim 3 wherein said lower and upper blade ends containing said teeth comprised a flared portion of each respective blade and the width of which approximates and preserves the working width of said housing, said housing provides an opening in the bottom thereof below said gear train and said lower blade body is adapted to provide a cover for said opening, wherein said motor operates at substantially high speed, said gear train provides a substantial speed reduction, and said coating substantially reduces the friction between said blades to thereby obtain substantially high shearing forces between said teeth.

8. A portable shear adapted to shearing a relatively narrow width of light grass, comprising:

(a) a housing providing a first substantially horizontal handle shaped compartment and a second compartment for storing a drive motor;

(b) a motor mounted in said second compartment and having a drive shaft extending therefrom;

(c) a manual control switch mounted in said housing and having connected wiring enabling said switch to connect said motor to an electrical source and thereby drive said shaft;

(d) reduction means driven by said shaft and having a drive member driven through said reduction means;

(e) a lower horizontal cutting blade having a generally rectangular thin flat sheet metal body having on one end a small plural number of cutting teeth of relatively short length, said lower blade body being fixedly secured to said housing below said reduction means and said teeth projecting forwardly thereof; and (f) an upper horizontal cutting blade having a generally rectangular thin flat sheet metal body, having a small plural number of shaped teeth on one end thereof and of substantially longer length than said lower blade teeth, said upper blade teeth having a slight downward curvature sufficient to effect a wiping action therewith, said upper blade being positioned on said lower blade to mate said teeth and having a pivotal mount intermediate its length and a drive connection to said drive member whereby said upper blade teeth are reciprocated to provide a cutting action and in the presence of a tough grass blade each said upper blade tooth being adapted to independently flex upwardly and slide over said tough grass blade to avoid jamming of said teeth.

9. A shear as claimed in claim 8 wherein said housing provides a third compartment for storing a battery, including a battery mounted in said third compartment, said battery providing said electrical source and further including circuit connector means mounted in said housing and adapting said battery to be connected to external charging means.

10. A shear as claimed in claim 9, said second compartment being vertically oriented, forwardly of and communicating with both said first and third compartments and said third compartment being substantially horizontal and disposed below said first compartment.

11. A portable shear adapted to shearing a relatively narrow width of light grass, comprising:

(a) a housing providing a first substantially horizontal handle shaped compartment and a second compartment for storing a drive motor;

(b) a motor mounted in said second compartment and having a drive shaft extending therefrom;

(c) a manual control switch mounted in said housing and having connected wiring enabling said switch to connect said motor to an electrical source and thereby drive said shaft;

(d) reduction means driven by said shaft and having a drive member driven through said reduction means;

(e) a lower horizontal cutting blade having a generally rectangular thin flat sheet metal body having on one end a small plural number of cutting teeth of relatively short length, said lower blade body being removably and fixedly secured to said housing below said reduction means and said teeth projecting forwardly thereof; and (f) an upper horizontal cutting blade having a generally rectangular thin flat sheet metal body, having a small plural number of shaped teeth on one end thereof and of substantially longer length than said lower blade teeth, said upper blade teeth having a slight downward curvature sufficient to effect a wiping action therewith, said upper blade being positioned on said lower blade to mate said teeth and having a pivotal mount adapted to lock said lower and upper blade as an assembly intermediate said upper blade length and a drive connection to said drive member whereby said upper blade teeth are reciprocated to provide a cutting action and in the presence of a tough grass blade each said upper blade tooth being adapted to independently flex upwardly and slide over said tough grass blade to avoid jamming of said teeth.

12. A portable cordless shear adapted to shearing a relatively narrow width of grass, comprising:
(a) a housing providing a first substantially horizontal handle shaped compartment and a second compartment;
(b) a battery operated electric motor mounted in said second compartment and having a drive shaft extending therefrom;
(c) a battery mounted in said housing;
(d) a manual control switch mounted in said housing and having connected wiring enabling said switch to connect said motor to said battery and thereby drive said shaft;
(e) reduction means driven by said shaft and having a drive member driven through said reduction means;
(f) a lower horizontal cutting blade having a generally rectangular thin flat sheet metal body having on one end a plural number of shaped cutting teeth of a predetermined length and flexibility, said lower blade body being removably mounted on said housing below said reduction means and said teeth projecting forwardly thereof; and
(g) an upper horizontal cutting blade having a generally rectangular thin flat sheet metal body, having a plural number of shaped teeth on one end thereof and of a predetermined length and flexibility, said upper and lower blade teeth having a slight curvature relative to each other sufficient to effect a wiping action therewith, said upper blade being positioned on said lower blade to mate said teeth, one of said blades being fixedly secured to said housing and the other having a pivotal mount and a drive connection to said drive member whereby said blade teeth of the pivotally mounted blade are reciprocated to provide a cutting action and in the presence of a tough grass blade selected said teeth on at least one of said blades being of sufficient said predetermined length and adapted to independently flex outwardly and slide over said tough grass blade to avoid jamming of said teeth.

References Cited
UNITED STATES PATENTS

| | | | |
|---|---|---|---|
| 2,652,626 | 9/1953 | Dutcher | 30—220 X |
| 3,049,802 | 8/1962 | Bork | 30—221 X |
| 3,212,188 | 10/1965 | Riley | 30—216 |
| 3,218,710 | 11/1965 | Bruck | 30—222 |

ROBERT C. RIORDON, Primary Examiner

J. C. PETERS, Assistant Examiner

U.S. Cl. X.R.

30—222